A. GROTHE & H. F. CARTER.
APPARATUS FOR FILTERING AND WASHING THE FILTERED MATERIAL.
APPLICATION FILED NOV. 18, 1908.
938,378. Patented Oct. 26, 1909.
2 SHEETS—SHEET 1.
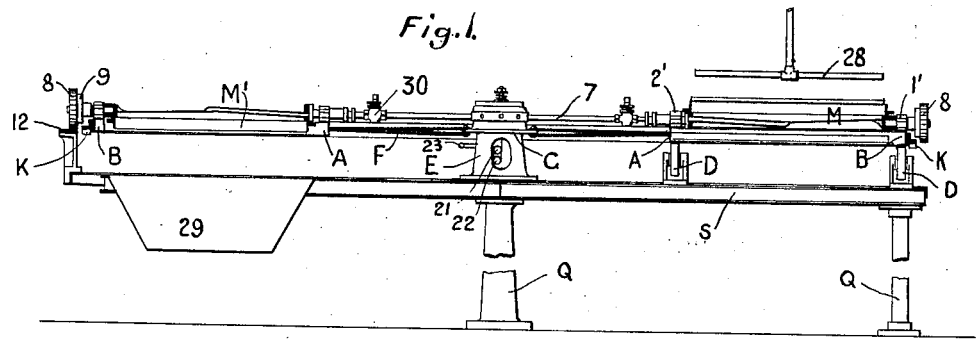
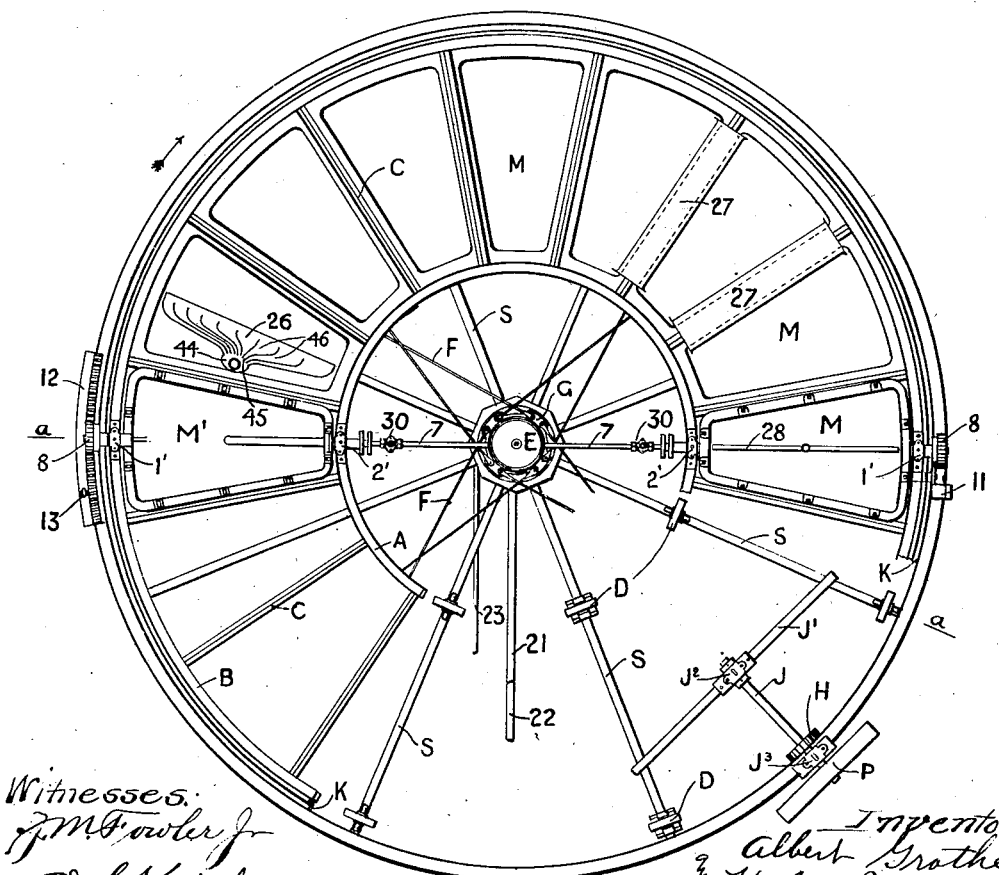

A. GROTHE & H. F. CARTER.
APPARATUS FOR FILTERING AND WASHING THE FILTERED MATERIAL.
APPLICATION FILED NOV. 18, 1908.
938,378.
Patented Oct. 26, 1909.
2 SHEETS—SHEET 2.
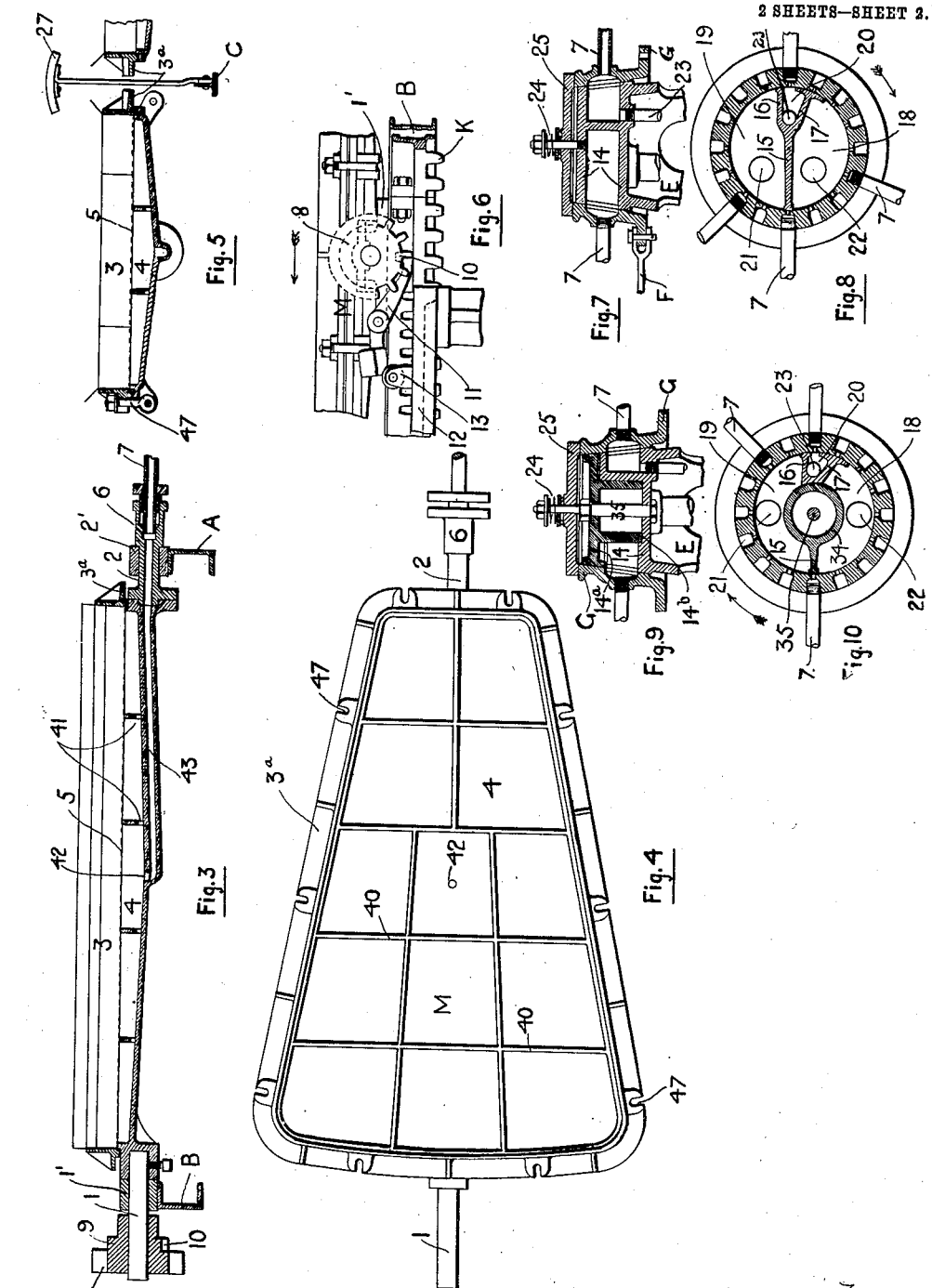
Witnesses
J. M. Fowler
A. L. Kitchin
Inventors
Albert Grothe
Herbert Fuller Carter
By Mason, Fenwick & Lawrence
their Attys

UNITED STATES PATENT OFFICE.

ALBERT GROTHE AND HERBERT FULLER CARTER, OF MEXICO, MEXICO.

APPARATUS FOR FILTERING AND WASHING THE FILTERED MATERIAL.

938,378.  Specification of Letters Patent.  Patented Oct. 26, 1909.

Application filed November 18, 1908. Serial No. 463,290.

*To all whom it may concern:*

Be it known that we, ALBERT GROTHE, a citizen of the United States, and HERBERT FULLER CARTER, a subject of the King of Great Britain, residing at Mexico city, Federal District, Mexico, have invented certain new and useful Improvements in Apparatus for Filtering and Washing the Filtered Material, of which the following is a specification.

Our invention relates to a novel method and means for effecting the separation of the solid from the liquid components of any mixture of such constituents, the thorough washing of the solids and conducting the separated solids and liquids to places where they can be discharged as waste or subjected to further treatment.

We especially accentuate the fact that the here proposed combined filter and washer is not of the immersed type and is continuous in action, receiving in one portion the material to be treated, separating it at another stage in the cycle of operations, cleansing the solid components at still another stage, periodically discharging them while continuously abstracting the liquid components from the mass under treatment.

While this invention is particularly adapted to the treatment of the sands and slimes produced in the cyanid treatment of ores, it is also applicable to the treatment and separation of any other mixture of solid and liquid ingredients.

We attain these objects by the procedure herein below set forth, and the apparatus illustrated in the accompanying drawings, in which:

Figure 1 is an elevation of the entire apparatus partly in section on the line *a—a;* Fig. 2, a plan view of the apparatus with some of the parts removed; Fig. 3, a longitudinal vertical section of one of the filter-boxes showing its operating mechanism; Fig. 4, a top plan of the filter-boxes with the filtering screen removed; Fig. 5, a transverse section of one of the filter-boxes, showing the deflecting device for insuring the entrance of all the material to be treated into several filter-boxes; Fig. 6, a detail view showing the mechanism for tipping the filter-boxes; Fig. 7, a vertical section of the central control manifold cock; Fig. 8, a horizontal section of said manifold cock; and Figs. 9 and 10 are vertical and horizontal sections respectively of a modified form of said central control manifold cock.

The frame of the structure consists of the two concentric circular members A and B, shown in the drawings as two channel irons in section, mutually braced and connected by radial spoke members C disposed so as to divide the surface between said two circles into a member of equi-angular truncated sectors, each of which contains one of the filter-boxes M. The inner circular frame member A is connected by a suitable number of tie rods F to the casing of the central control manifold cock E, about which the entire apparatus revolves over rollers D journaled in bearings resting upon and secured to the radial supporting beams S, said rollers being spaced on their respective beams, so as to come under the bottom flanges of the frame A and B. The supporting beams S rest upon columns Q rising from a suitable foundation of cement or masonry to a height sufficient to enable the introduction and operation, under the said supporting beams, of suitable means for receiving and abstracting the solid parts of the output of the filtering apparatus. The frame is rotated by pinion H keyed to the counter-shaft J, journaled internally at $J^2$ in the brace $J^1$, resting upon two of the supporting beams S, and externally at $J^3$, secured to the stationary supports of the apparatus, and receiving its motion from any suitable mechanism such as the pulley P. The pinion H meshes with the circular rack K secured to the ring B.

The filter-box M has an upper receiving part or hopper 3 provided with a flange $3^a$, by means of which it is detachably connected to the lower part 4 by swingbolts 47, or any other suitable means, to facilitate the introduction, renewal and cleaning of the removable filtering screen 5 made up of one or more thicknesses of the same or different materials such as duck, jute cloth, wire cloth, etc., supported by a permanent or removable wire screen resting on the tops of the strengthening ribs 40. The lower part 4 is the receiver of the strained liquid which freely drains from all parts through the holes 41 in ribs 40 to the central bottom outlet 42 emptying into the channel or pipe 43, leading inwardly under the filter-box toward the central control manifold cock with which it connects by means of pipe 7.

The joint between the hopper 3 and drainage basin 4 is made airtight by rubber gaskets or other means. The filter-box is revolubly mounted on trunnions 1 and 2 resting in bearings 1' and 2' secured to the frame B and A respectively, which allow the box to turn over completely on its central radial line. The inner trunnion 2 is hollow to make communication with the suction pipe or channel 43, draining the lowest part of the filter-box through the central orifice 42 and connected with pipe 7 by the stuffing box 6. The outer trunnion 1 carries the pinion 8, and pawl-wheel 9, located inside of 8, and provided with a slot 10 into which the back-weighed pawl lever 11 normally enters to hold the box horizontal and right side up until, in the course of the rotation imparted to the rack K and the boxes M by the pinion H, a point of the circumference is reached at M' Fig. 2 where it is desired to turn the filter-box upside down for the purpose of discharging and to subsequently restore it to its normal position. To accomplish this end a short rack 12 Figs. 1, 2 and 6, is fixed to the supporting beams S or the foundation of the apparatus in such a position that the pinion 8 engages at the right moment and simultaneously a fixed stop 13, Fig. 6 lifts pawl 11 out of the detent 10 so that the box M turns on its axis and has made a complete revolution when the pinion 8, arriving at the end of rack 12 disengages, at which moment pawl 11 falls back into groove 10 and holds the filter-box level until the same box, at the next turn of the apparatus, is once more brought into the same position. As each box is provided with the appliances as above described, it follows that each of these arriving at the point where it is desired to empty them, it in its turn revolves and discharges its contents.

The stationary central control manifold cock E of circular shape rests on and is secured to the supporting beams S. In its upper part it carries a manifold chamber formed between the upper and lower disks 14, which chamber is divided by partitions 15, 16, 17 into chambers 18, 19 and 20. Of these 18 and 19 communicate by means of pipes 21 and 22 with sources of suction and suitable reservoirs. Chamber 20 communicates by means of pipe 23 with the outer air or a reservoir of compressed air. Ring G, into which the ends of pipes 7 are fixed, is concentric with E and of somewhat greater height. Both E and G are slightly conical in shape so that there may be a tendency to self-tightening, which is assisted by the pressure of spring 24 on plate 25 resting on ring G.

At one part of the course the pulp distributer 26, Fig. 2 is suspended at a suitable height for supplying the material to be filtered to the boxes M as they successively pass underneath it. The amount to be fed can be regulated, according to the nature of the ore by means of constant-level supply tanks, float valves or similar means. In order to prevent pulp from dropping into the spaces between the filter boxes, deflectors 27 Figs. 2 and 5 are fixed to the distance pieces C of the frame and move with it, so covering these open spaces. As it is of importance that the pulp should be spread as evenly as possible over the surface of the filter-cloths, distributer 26 is so constructed that the pulp supplied to the receiver 44 is discharged through equidistant openings of uniform size 45 to diverging channels 46, the discharge end of which increases in width from the outer side toward the inner in such a manner that the same quantity of pulp is fed per unit of surface in all parts of the screen.

At a convenient place of the course a supply of washwater is admitted to the boxes M by means of pipe 28, Figs. 1 and 2 and under the place where it is desired to discharge the filter boxes a suitable hopper 29, Fig. 1 is constructed.

Each of the pipes 7 is provided with a stopcock 30 Figs. 1 and 2 so as to permit any of the boxes M to be cut out of the circuit.

In Figs. 9 and 10 a modification of the construction of the central control manifold cock E is represented, to be used in case it should be desirable to change the relative duration of the periods of filtering and washing. For this purpose the partition 15 is made movable in a circular direction by being fixed to and radiating from a ring 34 concentric with the central manifold cock casing. In this case the upper horizontal disk 14ª is not integral with the lower disk 14, but works in a recess 14ᵇ in the lower disk by means of its ring 34 and is secured in any desired position of the partition by the centerbolt 35, fixed in said lower disk 14.

The whole apparatus resting on beams S is supported by columns Q or any suitable structure of wood or other material, rising from suitable foundations to a convenient height above the ground.

The operation of the filter is as follows: The cocks 30 having been closed and the frame set to rotate, mixture to be filtered is fed into the distributer 26, by which it is distributed over the screen of the first filter-box M passing underneath it. Thereupon cock 30 pertaining to this filter-box is manually opened and suction under the filter-cloth begins, the clear solution passing through pipe 7 to chamber 18 of the control manifold cock and from there to the receiver destined for it. All the filter-boxes pass successively under the distributer and receive their charge, cock 30 of each box being manually opened as soon as it has been charged, whereupon all the pipes so opened discharge strong solution into chamber 18. When the material contained in the first box is sufficiently filtered, the outlet of its discharge pipe 7 into the control manifold cock is momentarily closed by the partition 15 and wash-water is added to the contents of the box, the outlet then passing on to the next chamber 19 of the control manifold cock, and the solution is conveyed to the receptacle destined for it. When the washing is complete pipe 7 is closed by partition 16, pawl 11 is lifted out of groove 10 by contact with stop 13 and rack 12 engages pinion 8, with the result that the filter-box is turned upside down. At this moment pipe 7 has communicated with chamber 20 and so the suction is removed from the underside of the filter-cloth and the material resting upon it drops into hopper 29, whence it is either loaded into cars or discharged by water or other means. As the box M continues its circular course, the action of rack 12 on pinion 8 restores it to its normal position with the filter-cloth uppermost and it then moves under the distributer to be filled with mixture. The operation is therefore truly continuous and the filtering, washing and discharging proceeds without a break.

The advantages claimed for this description of filter are the following: It is truly continuous and no time is lost on account of transferring the filters to other compartments for the purpose of washing or discharging. It is adapted to all kinds of ore, to any proportion of sand to slime and of both to the liquid in the pulp, as the rate of feed as well as the speed of the machine can be regulated so as to suit all possible conditions. It has a larger capacity per square foot of filter surface than any kind of vacuum filter in use, first on account of its continuous action, and secondly because during the filling of the boxes the sands settle down on the cloth first and the fine particles remain in suspension to the last, thus materially assisting rapid filtration while in all immersing filters the finer particles are drawn against the cloth first forming an obstacle to further filtration. No stirring apparatus of any kind is required to keep the heavier particles in suspension during filtration and the whole construction of the apparatus is thereby greatly simplified.

In the description of the operation it was stated that wash-water was added at a desired moment, while that is the only liquid it would probably be desired to add in the case of ore slimes, the same disposition would, in case of handling mixtures of another nature, be available for adding any suitable chemical or solvent. In fact the number of solutions which may be made and drawn off can be increased at will by apparatus suitably modified.

We do not confine ourselves to the precise construction or choice of material herein indicated, reserving the right to claim any modification or change within the scope of our invention as here set forth.

We claim:

1. A non-immersing filter having a horizontal circular frame carrying a plurality of circularly disposed filter-boxes each provided with independent controllable means for withdrawing the drainage liquids into a central control manifold cock, as well as for applying suction and air pressure to said filter-boxes during predetermined parts of the revolution of said circular frame.

2. A non-immersing filter having a circular frame carrying a plurality of circularly disposed filter-boxes, a stationary central control manifold cock as a center, an independent pipe between said manifold cock and each filter-box, controllable means for connecting said pipe with a source of suction, means for cutting off said suction, and for connecting said pipe with a source of air pressure, and means for inverting each of said filter-boxes during a predetermined portion of its circular travel, removing its solid contents and for returning it to its normal position.

3. A non-immersing filter of continuous action having a horizontal circular frame carrying a plurality of circularly disposed horizontal filter-boxes, revolubly mounted in said frame, in each of said filter-boxes a receiving hopper resting upon and detachably connected with a drainage basin forming a lower chamber, a horizontal filtering screen between said chambers, a stationary central control manifold cock, means for rotating said frame about said manifold cock as a center, an independent pipe between said manifold cock and each filter-box, controllable means for connecting said pipe with a source of suction, means for cutting off said suction at a predetermined point in the circular travel of said filter-box, for connecting said pipe with a source of air pressure and for reëstablishing said suction after said filter-box has advanced a desired distance on its path, means for supplying mixture to each of said filter boxes successively, and for uniformly distributing said supply over its said filtering screen, and means for revolving each of said filter boxes about its central line during a predetermined portion of its circular travel, and for returning it to its normal position after said box has made a predetermined advance in its said circular travel.

4. A non-immersing filter of continuous action having a horizontal circular frame carrying a plurality of circularly disposed horizontal filter-boxes, trunnions at the middle of each end of said boxes journaled in said frame, means for normally locking said trunnions against revolving, in each of said boxes a receiving hopper open on top resting upon and detachably connected to a drainage basin forming the lower chamber of said filter-box; a removable horizontal filtering screen between said chambers, a stationary central control manifold cock, means for rotating said frame about said manifold cock as a center, an independent pipe between said manifold cock and the drainage basin of each filter-box, controllable means for connecting said pipe with a source of suction, means for automatically shifting the connection between said pipe from the first to a different source of suction, at a predetermined part of the circular travel of said filter-box, for connecting said pipe with a source of air pressure and for reëstablishing said suction after said filter-box has advanced a desired distance in its path; means for supplying mixture to each of said filter-boxes successively and for uniformly distributing said supply over its filter-screen, means for supplying liquids to said filter-boxes at a predetermined point of the circular path, and means for revolving each of said filter-boxes about its said trunnions during a predetermined portion of its circular travel and for returning it to its normal position after said box has made a predetermined advance in its said circular travel.

5. A non-immersing filter of continuous action having a horizontal circular frame carrying a plurality of circularly disposed horizontal filter-boxes, trunnions at the middle of each end of said boxes journaled in said frame, on the outer trunnion a detent, and means for disengaging said detent at predetermined intervals and for reëngaging said detent in its normal position, in each of said filter-boxes a receiving hopper open on top, resting upon and detachably connected with a drainage basin forming the lower chamber of said filter-box, a removable horizontal filtering screen between said chambers, a permanent screen thereunder, resting upon strengthening ribs in said drainage basin, a stationary central control manifold cock, a circular rack attached to said frame, a stationary pinion meshing with said rack, means for driving said pinion, an independent pipe between said manifold cock and said drainage basin of each said filter-boxes, a casing about said central control manifold cock revolving about said cock with the said circular frame and containing the ends of said pipes, a cylindrical chamber in the upper part of said cock, communicating with the ends of said pipes and three vertical partitions into two large suction and one small air supply chamber, circumferential distances between the peripheral bearing ends of said partitions proportioned to the circumferential distances of said circular rack between the point of mixture intake, the point of liquid intake, the point of suction cut-off and the point of air cut-off, a separate suction pipe to each of said suction chambers, having separate source of suction, a pipe connecting said small air supply chamber with a source of air supply, a stationary mixture distributer located above the said filter-boxes, distributing channels in said distributer, a deflector in each open space between adjacent filter-boxes, a stationary liquid supply pipe over a point in the circular path of said filter-boxes practically opposite the mixture intake point; a segmental rack equiangular with the said filter-boxes secured to the stationary support of said circular frame, a pinion on the outer trunnion of each filter-box meshing with said segmental rack which it reaches in its travel, a pawl-wheel keyed to said outer trunnion, a pawl-lever normally engaging in a slot in the face of said pawl-wheel; a trip lever connected with said pawl-lever, a fixed stop on said segmental rack of suitable height to engage said trip-lever on its passage.

6. In a non-immersing filter with filter-boxes carried in a circular path by a revolving circular frame a central control manifold cock at the center of motion of said frame having a stationary body portion with a cylindrical space laterally incased by the wall of a casing concentric with said circular frame and constrained to revolve therewith, a pipe connection between each of said filter-boxes and said cylindrical space, said connection terminating in and revolving with said casing, chambers in said cylindrical space bounded by vertical partitions the peripheral ends of which bear against the inner surface of said casing at segmental distances apart, proportional to the segmental distances between points on said circular path at which the operations of admission of mixture, change of drainage delivery, cut-off of suction and air supply to the filter-boxes occur, the chamber bounded by partitions set to correspond to said operations having the corresponding independent pipe connections of suction and supply as the case may be.

7. In a non-immersing filter with filter-boxes traveling in a circular path and performing fixed operations at predetermined points of said path, a central control manifold cock having a stationary body portion with an upper cylindrical space formed between fixed upper and lower horizontal disks and the inner surface of a concentric revolving casing, a flange on said casing connected by tie-rods to said circular frame, three vertical partitions integral with said upper and lower disks, three chambers formed in said cylindrical space by said partitions, angular distances between the bearing ends of said partitions equal to the angular distance between the points on said circular path at which said predetermined operations take place, a separate suction pipe to each of said two chambers and an air supply pipe to the third.

8. In a non-immersing filter with filter-boxes carried in a circular path by a revolving circular frame, said filter-boxes subjected to distinct operations at predetermined points in said path, a central control manifold cock at the center of motion of said frame, having a stationary body portion with a cylindrical space formed between fixed upper and lower horizontal disks and the inner surface of a concentric revolving casing; conical bearings between the peripheral sides of said disks and said inner surface of said casing; a circular plate bearing upon the top of said casing and constraining it to its seat by being held down to said upper horizontal disk by adjustable mechanical means, a flange on said casing connected with tie-rods to said circular frame, a plurality of perforations through the wall of said casing each communicating directly with one of said filter-boxes, in said cylindrical space two suction and one air supply chamber formed therein by three vertical partitions integral with said upper and lower disks, a bearing surface at the peripheral end of each of said partitions completely closing any of said perforations which may be opposite said bearing surface, angular distances between said peripheral ends equal to the angular distances between the said predetermined points in said circular path at which the filter-boxes are subjected to distinct operations, a separate suction pipe to each of said suction chambers and an air supply pipe to said air supply chamber.

9. In a non-immersing filter with filter-boxes carried in a circular path by a revolving circular frame, said filter boxes being subjected to distinct operations at predetermined points in said path, a central control manifold cock at the center of motion of said frame having a stationary body portion with a cylindrical space formed between movable upper and lower fixed horizontal disks and the inner surface of a concentric revolving casing; a flange on said casing connected by tie-rods to said circular frame, a plurality of perforations through the wall of said casing each communicating directly with one of said filter-boxes, in said cylindrical space an air supply chamber formed by two fixed vertical partitions integral with said lower disk, two suction chambers occupying the remainder of said cylindrical space variable to each in size formed between the said two fixed vertical partitions, and a third partition movable circularly and secured to a ring integral with the said upper horizontal disk and concentric with said revolving casing and fitted into a recess in said lower horizontal disk; a central bolt secured to said lower disk, passing through said upper disk with a nut above and bearing on said upper disk, a bearing surface on the peripheral end of each of said partitions completely closing any of said perforations which may be opposite said bearing surface, angular distances between said predetermined points in said circular path at which the filter-boxes are subjected to distinct operations, a separate suction pipe to each of said suction chambers and an air supply pipe to said air supply chamber.

In testimony whereof we have hereunto set our hands in presence of two subscribing witnesses.
ALBERT GROTHE.
HERBERT FULLER CARTER.
Witnesses:
C. RANGMA,
K. N. SÖNDEGAARD.